May 14, 1929.                F. H. WINTER                1,713,156
                          REGULATING SYSTEM
                         Filed Jan. 29, 1927
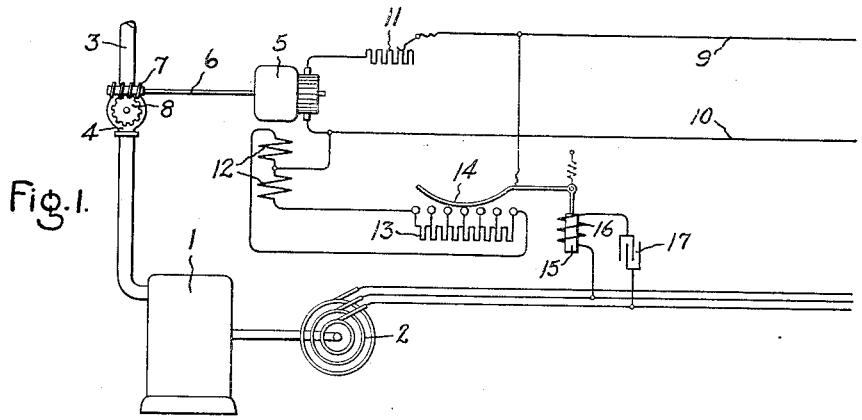
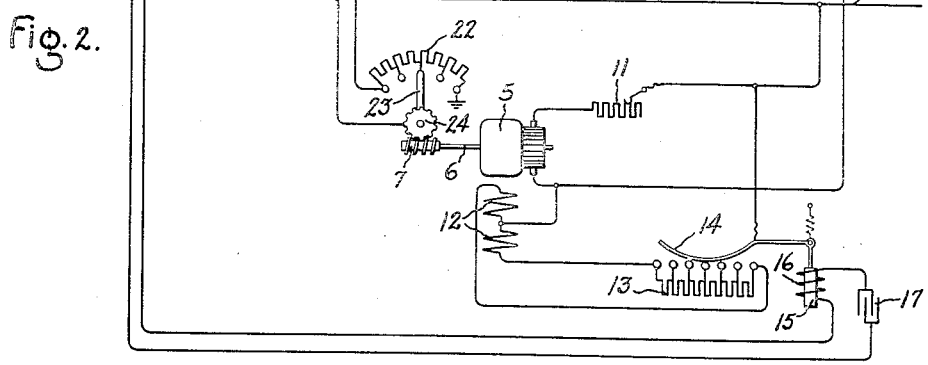
Inventor:
Fred H. Winter,
by
His Attorney.

Patented May 14, 1929.

1,713,156

UNITED STATES PATENT OFFICE.

FRED H. WINTER, OF SCHENECTADY, NEW YORK, ASSIGNOR TO GENERAL ELECTRIC COMPANY, A CORPORATION OF NEW YORK.

REGULATING SYSTEM.

Application filed January 29, 1927. Serial No. 164,622.

My invention relates to regulating systems and more particularly to regulating systems for controlling the speed of a source of power.

An object of my invention is to provide a regulator and a system of regulation for operating a controlling device to maintain at a predetermined value an operating characteristic such as the speed of a device receiving or delivering energy, which shall be simple and reliable in operation, and which shall be quickly responsive to a departure of the regulated device from a predetermined value of the regulated characteristic to effect a compensating action proportional to the magnitude of the departure from the predetermined value.

Since my invention is particularly adapted for controlling the speed of a prime mover or an electric motor the detailed description will be directed to these two embodiments since it is believed the invention will be of greatest utility in systems of this type.

In accordance with my invention the speed of the device which is to be regulated is maintained constant by the operation of a pilot motor which is arranged to effect the necessary corrective action by controlling the supply of fluid energy to a prime mover or by varying an electrical condition governing the speed of the dynamo-electric machine. The pilot motor is provided with differential field windings or a field winding of two sections arranged so that the magnetic fluxes of each winding or section are equal and normally opposed. A resistance is connected in circuit with both windings or sections. Upon a variation in the speed of the device regulated, the flow of current in both sections of the field winding is simultaneously and inversely varied by varying the value of the resistance in circuit with each section by means of the operation of an electromagnetic device having a coil which is connected to be responsive to an alternating current having a voltage and frequency depending upon the speed of the device regulated. The inductance and capacity in the circuit of the operating coil are so proportioned that the circuit is resonant to a frequency higher than the normal frequency of the alternating current when the regulated device is operated at normal speed. Hence any decrease in speed will decrease the current through the operating coil as the frequency departs from the resonant condition and any increase in speed will increase the current as the frequency approaches the resonant condition. Since the voltage of the alternating current likewise varies with the change in speed, the operating coil of the electromagnetic device will be effected by two factors varying directly with the speed of the device controlled. If the speed of a prime mover driving an alternating current generator is being controlled the operating coil of the electromagnetic device may be energized from the main alternating current circuit and the pilot motor will be arranged to actuate a valve or suitable means to control the speed of the prime mover. In some cases where it is desired to control the speed of a direct current motor a small auxiliary alternating current generator will be arranged to be operated at a speed proportional to the speed of the motor and this generator will energize the operating circuit of the electromagnetic device which in turn controls the operation of the pilot motor to vary the field excitation of the motor.

My invention will be better understood by reference to the following description taken in connection with the accompanying drawing, and its scope will be pointed out in the appended claims.

In the accompanying drawing, Fig. 1 is a diagrammatic representation of an embodiment of my invention for controlling the speed of a prime mover, and Fig. 2 is a similar arrangement adapted for controlling the speed of a direct current motor.

Referring to Fig. 1, a prime mover 1 is arranged to drive an alternating current generator 2. The fluid energy for actuating the prime mover is admitted through a suitable conduit 3 having a valve 4 therein to vary the supply of fluid energy or any condition of the fluid energy to or from the prime mover which will vary the speed. The position of this valve is controlled by a pilot motor 5. The pilot motor may be connected to actuate the valve in any suitable manner, and, as shown, this connection comprises a shaft extension 6 carrying a worm 7 which is arranged to cooperate with a worm wheel 8 suitably secured to the controlling member of the valve 4. The armature circuit of pilot motor 5 is energized from any convenient and suitable source of current indicated by conductors 9 and 10. A resistance 11 is introduced in series relation with the armature circuit and functions as a limiting resistance. The pilot motor is provided with a field winding 12 which is tapped in the middle or equivalent electrical midpoint, and is connected at this point to conductor 10. The outer terminals of this field winding are connected together through a resistance 13. Cooperating with the resistance 13 is a contact member 14 positioned normally at the midpoint of the resistance and connected to conductor 9. This contact member 14 is preferably of the rolling type, and, as shown, takes the form of a rocker arm. This construction eliminates sliding friction and permits a small force to effect a change in the position of the rocker arm, since there is little or no force opposing the change. This arrangement eliminates any tendency of over-travel and permits effective use of a sensitive actuating device.

The rocker arm 14 is controlled by an electromagnetic device comprising a plunger 15 suitably connected to the rocker arm and controlled by an operating coil 16. The coil 16 is connected to be responsive to the voltage and frequency of the generator 2. In the circuit of the operating coil a condenser 17 is connected and so proportioned with reference to the inductance of the operating coil 16 that the operating coil circuit is resonant to a frequency higher than the normal operating frequency of generator 2.

The system shown in Fig. 2 is suitable for operation with a direct current motor. In this arrangement, motor 18 is connected to be energized from a direct current circuit comprising supply conductors 19 and 20. This motor, as shown, is of the shunt wound type comprising a field winding 21 connected to be energized from the supply conductors. The energization of field winding 21 is controlled by a rheostat 22 provided with a rheostat arm 23, which is arranged to be operated by the pilot motor 5 through suitable mechanical connection such as gears to permit the proper relative speed between the rheostat arm and the pilot motor. As shown, the rheostat arm is provided with a worm wheel 24 which cooperates with a worm 7 on the shaft extension 6.

In order to provide an alternating current source for energizing the operating coil 16, an auxiliary alternating current generator 25 is connected to be operated at a speed proportional to the speed of the motor 18. The circuit of the coil 16 is connected to be responsive to the voltage and frequency of generator 25. Since the armature and field circuits of the pilot motor 5, control rheostat 13, and operating mechanism therefor, is the same as shown in Fig. 1, like numerals have been used to designate similar parts; and since the same connections are used, it is believed no further description is necessary.

The operation of the system shown in Fig. 1 is as follows: Assume the prime mover 1 is operating at normal speed. In this case the rocker arm 14 will be arranged to permit equal and opposite excitation in the two sections of field winding 12 and the resultant field excitation will be substantially zero so there is no tendency for the pilot motor to rotate. Now, assume the speed of the prime mover tends to rise above the predetermined normal speed. The alternating current generator likewise tends to increase in speed and the frequency of the alternating current tends to rise. The circuit of coil 16 being resonant to a frequency higher than the normal frequency of generator 2 will tend to take more current because of the increase in frequency and voltage. As the current increases, plunger 15 is pulled up into the coil and the rocker arm 14 rolling over the contacts of resistance 13 simultaneously and inversely changes the flow of current in the two sections of field winding 12, thereby giving a field flux in a direction to rotate pilot motor 5 in a direction to move valve 4 properly to decrease the speed of the prime mover. In a similar manner a tendency for a decrease in speed of the prime mover will tend to decrease the frequency and voltage of generator 2 and hence the current through the coil 16. The plunger 15 will fall and roll rocker arm 14 in the opposite direction and thereby simultaneously and inversely vary the flow of current in the two sections of field winding 12 so that the resultant excitation will be in the opposite direction. This reversed direction of field excitation will cause pilot motor 5 to rotate in the opposite direction and move valve 4 in a direction to increase the speed of the prime mover.

It will be noted that, if the departure from the normal speed is small, the rocker arm will be moved a small distance and, therefore, the effective field excitation, to rotate pilot motor 5 in a given direction, will be of a corresponding magnitude. This means that the speed of the pilot motor will be substantially proportional to the magnitude of the change so that the motor may rotate slowly or rapidly to effect a correction, depending upon the extent of the departure from normal. This combination comprising the rolling contact and operating arrangement may be adjusted to be quite sensitive so that the rocker arm may make a complete movement for a 1% change in speed. It is also to be noted that this arrangement will minimize any over-travel or hunting owing to the type of contact used and manner in which the pilot motor is caused to operate.

The operation of the arrangement shown in Fig. 2 is similar to that described in connection with Fig. 1. An increase in speed of motor 18 will cause a corresponding change in the frequency and voltage of the auxiliary generator 25 so that pilot motor 5 will be operated in the same manner as previously described to rotate rheostat arm 23 in a direction to decrease the field resistance and thereby decrease the speed of motor 18. In a similar manner a decrease in the speed of motor 18 will be corrected by pilot motor 5 being rotated in a direction to decrease the field excitation of motor 18 and thereby increase the speed.

While I have shown and described but two embodiments of my invention, it will be apparent to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. The combination of a source of power, a source of electrical energy driven thereby, a dynamo-electric machine having an excitation circuit comprising two sections with opposed normally-balanced fluxes for controlling an operating characteristic of said source of power, and means responsive to an electrical characteristic of said source of electrical energy to cause an inverse change in the magnitude of said fluxes for effecting rotation of said dynamo-electric machine at a speed substantially proportional to the amount of the departure of said operating characteristic from a predetermined value.

2. The combination of a source of power, a source of electrical energy arranged to be driven at a speed proportional to the speed of said source of power, an electric motor having differential field windings with magnetic fluxes normally balanced for controlling the speed of said source of power, and means responsive to an electrical characteristic of said source of electrical energy for causing an inverse change in the magnitude of the current in said field windings to effect rotation of said electric motor in a direction to maintain said source of power at a predetermined speed.

3. The combination of a source of power, a source of alternating current driven thereby, an electric motor having a field winding comprising two sections with opposed normally-balanced fluxes for controlling the speed of said source of power, and means for varying simultaneously and inversely the magnitude of the current in the respective sections of said field winding for rotating said motor in a direction to maintain said source of power at a predetermined speed.

4. The combination of a source of power, a source of alternating current driven thereby, an electric motor having a field winding comprising two sections with opposed normally-balanced fluxes for controlling the speed of said source of power, a resistance in series with said field winding, and means responsive to the voltage and frequency of said alternating current source for varying simultaneously and inversely the resistance in circuit with the respective sections of said field winding.

5. The combination of a source of power, a source of alternating current driven thereby, an electric motor having a field winding comprising two sections with opposed normally-balanced fluxes for controlling the speed of said source of power, a resistance in series with said field winding, and means responsive to the voltage of said alternating current source for varying simultaneously and inversely the resistance in circuit with the respective sections of said field winding.

6. The combination of a source of power, a source of alternating current driven thereby, an electric motor having a field winding comprising two sections with opposed normally-balanced fluxes for controlling the speed of said source of power, a resistance in series with said field winding, and means responsive to the frequency of said alternating current source for varying simultaneously and inversely the resistance in circuit with the respective sections of said field winding.

7. A prime mover having means for varying the speed thereof, means comprising an electric motor having a field winding comprising two sections with opposed normally-balanced fluxes for operating said speed varying means, and means responsive to the speed of said prime mover for varying simultaneously and inversely the current in the respective sections of said field winding to effect rotation of said motor at a speed proportional to the departure in speed of said prime mover from a predetermined value.

8. In a regulating system for controlling the speed of a rotating device, an electric motor, a source of electrical energy for said motor, a field winding for said motor comprising two sections connected to have a current flowing in opposite directions in said sections, a resistance in the circuit of said field winding, a contact cooperating with said resistance and normally positioned for causing a flow of current in said field sections to provide opposed balanced fluxes, and means responsive to the speed of said rotating device for changing the position of said contact when the speed of said device departs from a predetermined value.

9. In a regulating system for controlling the speed of a rotating device, an electric motor, a source of electrical energy for said motor, a field winding for said motor connected at its electrical midpoint to one terminal of said source of energy, a resistance connected across the outer terminals of said field winding, a rolling contact connected to the other terminal of said source of energy and cooperating with said resistance for introducing normally an equal resistance in the circuit of each portion of said field winding, an electromagnetic device responsive to the speed of said rotating device for changing the position of said rolling contact when the speed of said rotating device departs from a predetermined value.

In witness whereof, I have hereunto set my hand this 28th day of January, 1927.

FRED H. WINTER.